(12) United States Patent
Yeh et al.

(10) Patent No.: US 12,501,710 B2
(45) Date of Patent: Dec. 16, 2025

(54) ELECTRONIC DEVICE

(71) Applicant: InnoLux Corporation, Miao-Li County (TW)

(72) Inventors: Chu-Ling Yeh, Miao-Li County (TW); Wan-Yi Chen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/928,573

(22) Filed: Oct. 28, 2024

(65) Prior Publication Data

US 2025/0176268 A1 May 29, 2025

(30) Foreign Application Priority Data

Nov. 27, 2023 (CN) .......................... 202311592281.X

(51) Int. Cl.
| | |
|---|---|
| *G09G 3/20* | (2006.01) |
| *G09G 5/10* | (2006.01) |
| *H01L 23/66* | (2006.01) |
| *H01L 25/16* | (2023.01) |
| *H10D 86/40* | (2025.01) |
| *H10D 86/60* | (2025.01) |

(52) U.S. Cl.
CPC ............... *H10D 86/60* (2025.01); *G09G 5/10* (2013.01); *H01L 23/66* (2013.01); *H01L 25/167* (2013.01); *H10D 86/441* (2025.01); *G09G 2300/0426* (2013.01); *G09G 2380/04* (2013.01); *H01L 2223/6677* (2013.01)

(58) Field of Classification Search
CPC .. G09G 3/20; G09G 5/00; G09G 5/10; G09G 2300/0426; G09G 2380/04; G09G 2380/06; G09G 9/30; G02F 1/1333; G02F 1/15; G02F 1/16757; H10K 77/10; H10D 2223/6677; H10Q 21/00
See application file for complete search history.

(56) References Cited

U.S. PATENT DOCUMENTS

| | | | | |
|---|---|---|---|---|
| 7,468,774 | B2 * | 12/2008 | Sakama ................... | G02F 1/13 345/206 |
| 11,355,863 | B2 * | 6/2022 | Jang ........................ | H01Q 19/10 |
| 2013/0229362 | A1 * | 9/2013 | Liu ........................... | G06F 3/041 345/173 |
| 2014/0028619 | A1 * | 1/2014 | Huang ..................... | G06F 3/0412 455/575.1 |

(Continued)

FOREIGN PATENT DOCUMENTS

| | | | |
|---|---|---|---|
| CN | 108604734 A | | 9/2018 |
| CN | 214504067 U | * | 10/2021 |

(Continued)

*Primary Examiner* — Joe H Cheng
(74) *Attorney, Agent, or Firm* — MUNCY, GEISSLER, OLDS & LOWE, P.C.

(57) ABSTRACT

An electronic device includes a substrate, a dimming unit, an antenna unit and a protective layer. The substrate includes a display area and a peripheral area, wherein the peripheral area surrounds the display area. The dimming unit is disposed in the display area. The antenna unit is disposed in the peripheral area. The protective layer is disposed in the peripheral area. In the top view direction of the electronic device, the protective layer overlaps at least part of the antenna unit, and is disposed on at least part of the antenna unit.

20 Claims, 5 Drawing Sheets

(56) References Cited

U.S. PATENT DOCUMENTS

| | | | | |
|---|---|---|---|---|
| 2014/0354494 A1* | 12/2014 | Katz | ...................... | H01Q 1/273 |
| | | | | 343/718 |
| 2016/0093943 A1* | 3/2016 | Yang | .................... | G06F 1/1698 |
| | | | | 343/702 |
| 2017/0262120 A1* | 9/2017 | Liu | ........................ | H04B 5/263 |
| 2024/0079784 A1* | 3/2024 | Wang | ....................... | H01Q 1/48 |

FOREIGN PATENT DOCUMENTS

| | | | | | |
|---|---|---|---|---|---|
| CN | 114967263 A | * | 8/2022 | .............. | H01Q 1/22 |
| TW | I276246 B | | 3/2007 | | |
| TW | 202207528 A | | 2/2022 | | |

\* cited by examiner

ELECTRONIC DEVICE

CROSS-REFERENCE TO RELATED APPLICATIONS

This application claims the benefits of the Chinese Patent Application Serial Number 202311592281.X, filed on Nov. 27, 2023, the subject matter of which is incorporated herein by reference.

BACKGROUND

Field of the Disclosure

The present disclosure relates to an electronic device and, more particularly, to an electronic device including an antenna unit.

Description of Related Art

With the advancement of science and technology and in response to market demand, many products are increasingly developing electronically, wherein electronic shelf labels have the advantages of being environmentally friendly, efficiently updating label content, saving labor costs, and having low error rates, so that, in the retail market and warehouse management, the electronic shelf labels have gradually attracted much attention.

However, current electronic shelf labels still have shortcomings such as high cost, which limits the popularization thereof. Therefore, there is an urgent need to provide an improved electronic device that can alleviate and/or obviate the aforementioned defects.

SUMMARY

The present disclosure provides an electronic device, which comprises: a substrate including a display area and a peripheral area, wherein the peripheral area surrounds the display area; a dimming unit disposed in the display area; an antenna unit disposed in the peripheral area; and a protective layer disposed in the peripheral area; wherein, in a top view direction of the electronic device, the protective layer overlaps at least part of the antenna unit and is disposed on at least part of the antenna unit.

Other novel features of the disclosure will become more apparent from the following detailed description when taken in conjunction with the accompanying drawings.

DETAILED DESCRIPTION OF EMBODIMENT

Figure 1:
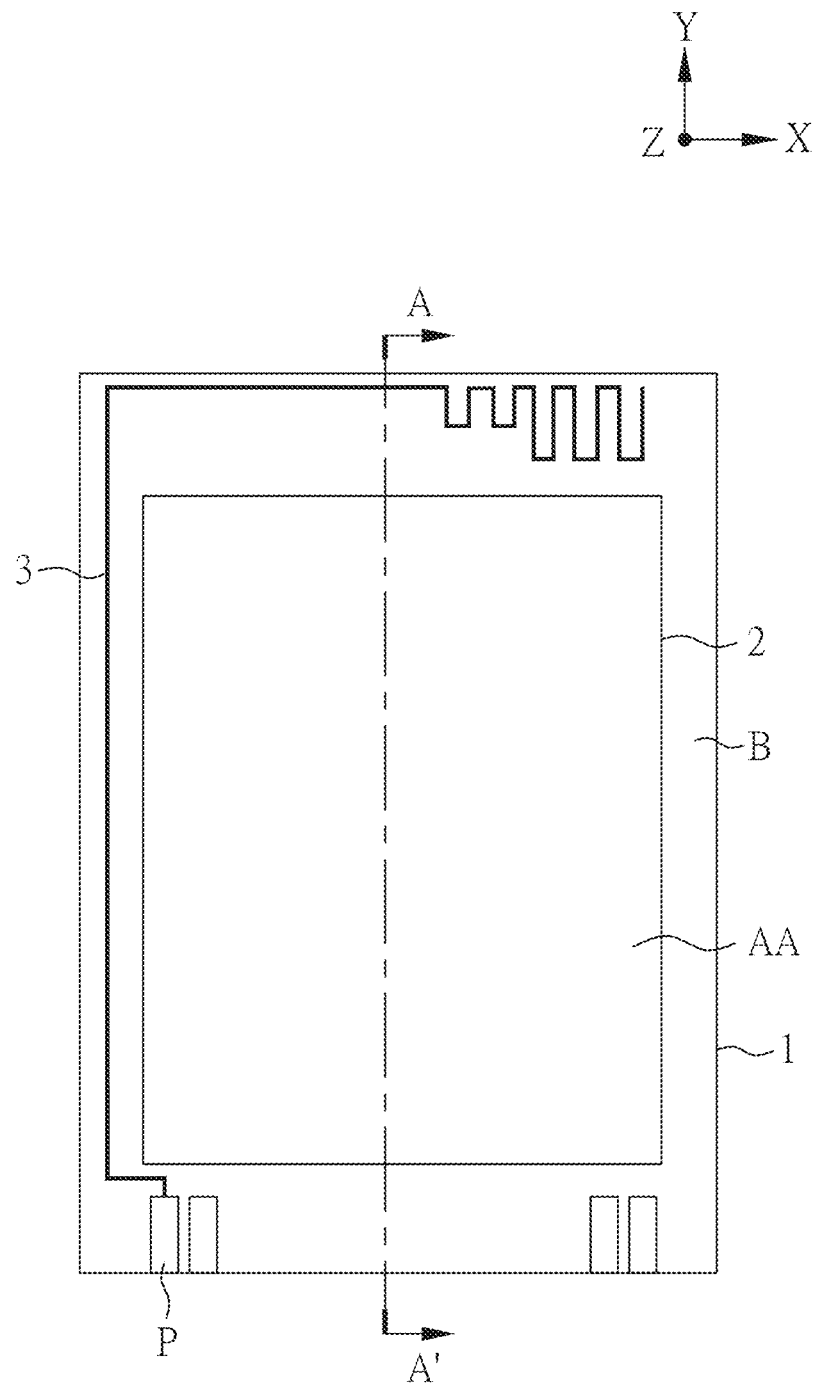
FIG. 1 is a schematic top view of part of an electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided. In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. The use of these ordinal numbers is only for clearly distinguishing a claimed element with a certain name from another claimed element with the same name.

In the entire specification and the appended claims of the present disclosure, certain words are used to refer to specific components. Those skilled in the art should understand that electronic device manufacturers may refer to the same components by different names. The present disclosure does not intend to distinguish those components with the same function but different names. In the claims and the following description, the words "comprise", "include" and "have" are open type language, and thus they should be interpreted as meaning "including but not limited to . . . ". Therefore, when the terms "comprise", "include" and/or "have" are used in the description of the present disclosure, they specify the existence of corresponding features, regions, steps, operations and/or components, but do not exclude the existence of one or more corresponding features, regions, steps, operations and/or components.

In the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "range of the first value to the second value" and "range between the first value and the second value" indicate that the range includes the first value, the second value, and other values between the first value and the second value.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, relative terms such as "below" or "bottom", and "above" or "top" may be used in the embodiments to describe the relationship between one component and another component in the drawing. It can be understood that, if the device in the drawing is turned upside down, the components described on the "lower" side will become the components on the "upper" side. When the corresponding member (such as a film or region) is described as "on another member", it may be directly on the other member, or there may be other members between the two members. On the other hand, when a member is described as "directly on another member", there is no member between the two members. In addition, when a member is described as "on another member", the two members have a vertical relationship in the top view direction, and this member may be above or below the other member, while the vertical relationship depends on the orientation of the device.

In the present disclosure, the thickness, length and width can be measured by using an optical microscope, and the thickness can be measured by the cross-sectional image in an electron microscope, but it is not limited thereto. In addition, there may be a certain error in any two values or directions used for comparison. If the first value is equal to the second value, it implies that there may be an error of about 10% between the first value and the second value. If the first direction is perpendicular to the second direction, the angle between the first direction and the second direction may be 80 to 100 degrees. If the first direction is parallel to the second direction, the angle between the first direction and the second direction may be 0 to 10 degrees.

It should be noted that the technical solutions provided by the different embodiments described hereinafter may be used interchangeably, combined or mixed to form another embodiment without violating the spirit of the present disclosure.

Figure 2:
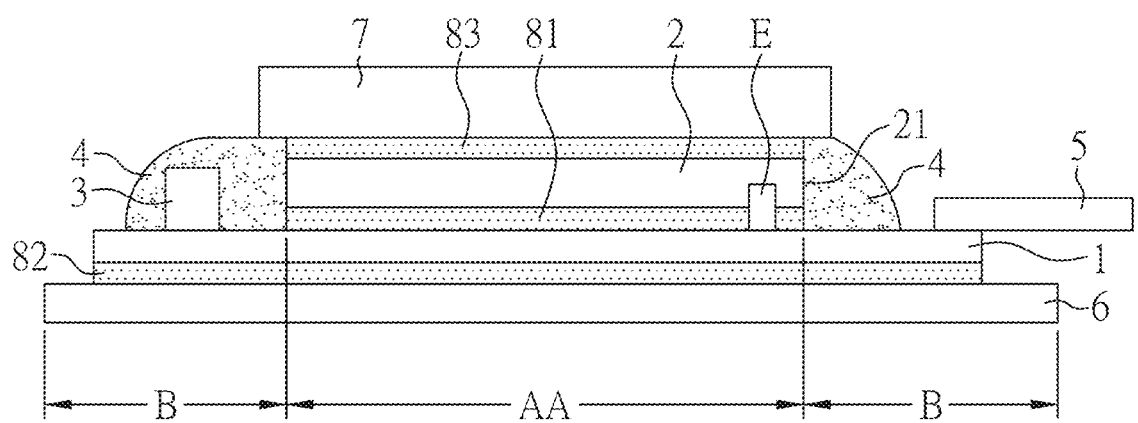
FIG. 2 is a schematic cross-sectional view of the electronic taken along line A-A' in FIG. 1.

FIG. 1 is a schematic top view of part of an electronic device according to an embodiment of the present disclosure. FIG. 2 is a schematic cross-sectional view of the electronic device taken along line A-A' in FIG. 1. For convenience of explanation, some components are omitted in FIG. 1.

In one embodiment of the present disclosure, as shown in FIG. 1 and FIG. 2, the electronic device may include: a substrate 1 including a display area AA and a peripheral area B, wherein the peripheral area B surrounds the display area AA; a dimming unit 2 disposed in the display area AA; an antenna unit 3 disposed in the peripheral area B; and a protective layer 4 disposed in the peripheral area B, wherein, in the top view direction Z of the electronic device, the protective layer 4 overlaps at least part of the antenna units 3 and is disposed on at least part of the antenna units 3. In the present disclosure, through directly disposing the antenna unit 3 in the peripheral area B of the substrate 1, more specifically, through disposing the material of the antenna unit 3 in the peripheral area B of the substrate 1 by deposition, sputtering, coating, lithography process, other suitable methods or a combination thereof, there is no need to add an additional antenna device so as to achieve a cost-saving effect.

In one embodiment of the present disclosure, as shown in FIG. 1, the electronic device may include a plurality of pads P, which are disposed in the peripheral area B. The antenna unit 3 is electrically connected to one of the plurality of pads P, and the dimming unit 2 is electrically connected to another one of the plurality of pads P. The electronic device of the present disclosure may receive or send signals through the antenna unit 3, thereby controlling or driving the dimming unit 2, so that the electronic device displays an image.

In one embodiment of the present disclosure, as shown in FIG. 2, the electronic device may further include a circuit structure 5, wherein the circuit structure 5 may be electrically connected to a plurality of pads P (as shown in FIG. 1). Therefore, the electronic device may receive the signal through the antenna unit 3 and transmit the signal to the circuit structure 5 through the pad P, and then provide the signal to the dimming unit 2 through another pad P to display the required image.

In the present disclosure, as shown in FIG. 1, the "display area" refers to, for example, the area where the substrate 1 and the dimming unit 2 overlap in the top view direction Z of the electronic device. The "non-display area" refers to, for example, an area where the substrate 1 and the dimming unit 2 do not overlap in the top view direction Z of the electronic device.

In one embodiment of the present disclosure, as shown in FIG. 2, the protective layer 4 may be disposed around the dimming unit 2, so the protective layer 4 may completely cover the antenna unit 3. The protective layer 4 may be used to block external air or moisture from entering the dimming unit 2, thereby improving the reliability of the electronic device. In one embodiment of the present disclosure, as shown in FIG. 2, the protective layer 4 may be in contact with the sidewall 21 of the dimming unit 2.

In the present disclosure, the material of the substrate 1 may be glass, quartz, sapphire, ceramic, plastic, polycarbonate (PC), polyimide (PI), polypropylene (PP), polyethylene terephthalate (PET), polymethylmethacrylate (PMMA), other suitable materials or a combination of the above materials, but the present disclosure is not limited thereto. In addition, in the present disclosure, although not shown in the figures, the substrate 1 may include conductive layers, wires, active components, suitable components or a combination thereof, but the present disclosure is not limited thereto.

In the present disclosure, the dimming unit 2 may include a display medium layer, and suitable materials for the display medium layer may include guest host type liquid crystal (GHLC), dye liquid crystal, twisted nematic liquid crystal (TN LC), super twisted nematic liquid crystal (STN LC), polymer dispersed liquid crystal (PDLC), polymer network liquid crystal (PNLC), cholesteric texture liquid crystal, polymer-stabilized cholesteric texture liquid crystal (PSCT LC), suspended particle material (SPD), electrochromic material, microcapsule electrophoresis, microcup electrophoresis, quick-response liquid powder display (QR-LPD) or a combination thereof, but the present disclosure is not limited thereto. In addition, although not shown in the figures, in the present disclosure, the dimming unit 2 may also include a conductive layer for driving or controlling the display medium layer.

In the present disclosure, the material of the antenna unit 3 may include gold, silver, copper, aluminum, titanium, chromium, nickel, molybdenum, tungsten, alloy of the above metals, indium tin oxide (ITO), indium zinc oxide (IZO), indium tin zinc oxide (ITZO), indium gallium zinc oxide (IGZO) or a combination thereof, but the present disclosure is not limited thereto.

In the present disclosure, the material of the protective layer 4 may include glass glue, optical glue, silicone glue, hot melt glue, AB glue, light-curing glue, polymer glue, resin or a combination thereof, but the present disclosure is not limited thereto.

In the present disclosure, the same or different materials may be used to form the plurality of pads P, and the materials of the plurality of pads P may each include gold, silver, copper, aluminum, titanium, chromium, nickel, molybdenum, tungsten, indium tin oxide (ITO), indium zinc oxide (IZO), indium tin zinc oxide (ITZO), indium gallium zinc oxide (IGZO) or a combination thereof, but the present disclosure is not limited thereto.

In one embodiment of the present disclosure, as shown in FIG. 2, the electronic device may further include a support layer 6, wherein the substrate 1 is disposed on the support layer 6. As a result, the reliability of the electronic device may be improved. In one embodiment of the present disclosure, as shown in FIG. 2, the electronic device may further include a protective substrate 7 disposed on the dimming unit 2. The protective substrate 7 may be used to protect the dimming unit 2, thereby reducing damage to the dimming unit 2 caused by external force. In the present disclosure, materials similar to the substrate 1 may be used to form the support layer 6 and the protective substrate 7, respectively, or organic polymer materials may be used to form the support layer 6 and the protective substrate 7, such as polyimide (PI), polyethylene (PE), polyvinylchloride (PVC), polystyrene (PS), acrylic, fluoropolymer, polyester or nylon, or other organic materials, but the present disclosure is not limited thereto and a detailed description is deemed unnecessary.

In one embodiment of the present disclosure, as shown in FIG. 2, the electronic device may further include an adhesive layer 81 disposed between the substrate 1 and the dimming unit 2, so that the substrate 1 and the dimming unit 2 may be bonded together. In one embodiment of the present disclosure, as shown in FIG. 2, the electronic device may further include an adhesive layer 82 disposed between the substrate 1 and the support layer 6 so that the substrate 1 and the support layer 6 may be bonded together. In one embodiment of the present disclosure, as shown in FIG. 2, the electronic device may further include an adhesive layer 83 disposed between the dimming unit 2 and the protective substrate 7, so that the dimming unit 2 and the protective substrate 7 may be bonded together. Therefore, in one embodiment of the present disclosure, the support layer 6, the substrate 1, the dimming unit 2 and the protective substrate 7 may be bonded together through the adhesive layers 81, 82, 83, respectively. In the present disclosure, the materials of the adhesive layers 81, 82, 83 may be the same or different from each other. The materials of the adhesive layers 81, 82, 83 may each include glass glue, optical glue, silicone glue, tape, hot melt glue, AB glue, two-component adhesive, light-curing adhesive, polymer glue, resin or a combination thereof, but the present disclosure is not limited thereto.

In one embodiment of the present disclosure, as shown in FIG. 2, the electronic device may further include a conductive element E disposed on the substrate 1, wherein the conductive element E may be electrically connected to the conductive layer (not shown). The electronic device of the present disclosure may control or drive the dimming unit 2 by applying voltages to the conductive layer (not shown) on the substrate 1 and the conductive layer (not shown) in the dimming unit 2, respectively, so as to cause the electronic device to display images. In the present disclosure, the material of the conductive element E may include gold, silver, copper, aluminum, titanium, chromium, nickel, molybdenum, tungsten, alloy of the above metals, indium tin oxide (ITO), indium zinc oxide (IZO), oxide Indium tin zinc oxide (ITZO), indium gallium zinc oxide (IGZO) or a combination thereof, but the present disclosure is not limited thereto.

Figure 3:
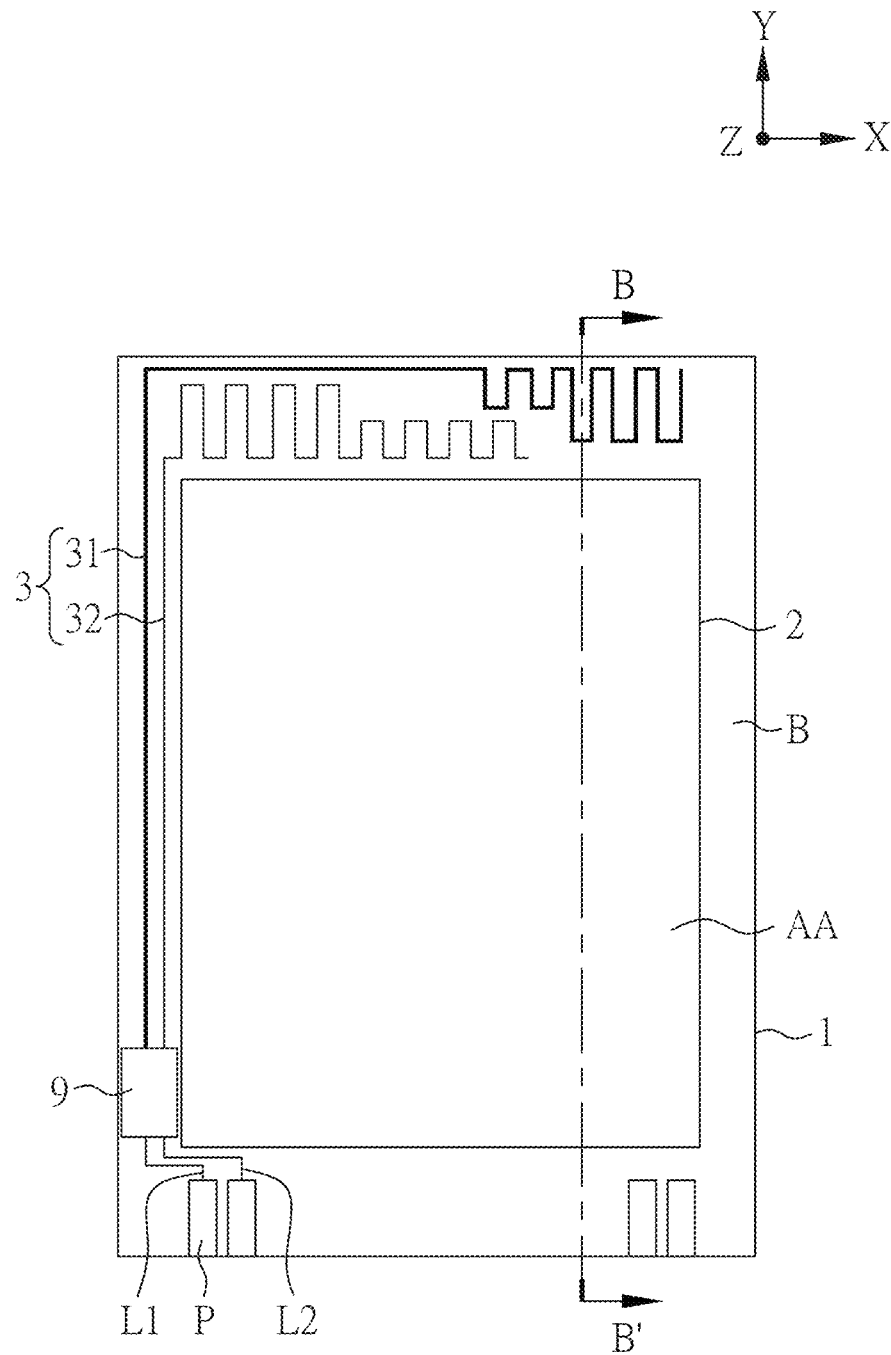
FIG. 3 is a schematic top view of part of an electronic device according to an embodiment of the present disclosure.

FIG. 3 is a schematic top view of part of an electronic device according to an embodiment of the present disclosure. The electronic device of FIG. 3 is similar to that of FIG. 1 except for the following differences. In addition, the schematic cross-sectional view of the electronic device taken along line B-B' in FIG. 3 may be that as shown in FIG. 2 and thus a detailed description is deemed unnecessary.

In one embodiment of the present disclosure, as shown in FIG. 3, the antenna unit 3 may include a first antenna 31 and a second antenna 32, wherein the operating frequency of the first antenna 31 is different from the operating frequency of the second antenna 32. The operating frequency may be, for example, the receiving frequency or transmitting frequency of the antenna. Therefore, the electronic device of the present disclosure may be used to receive or transmit signals of different frequencies, which may enhance the application scope. In addition, although not shown in the figures, in other implementations of the present disclosure, the number of antennas may be increased as needed, and the receiving frequency or transmitting frequency of each antenna are different from each other, and may be used to receive or transmit signals of different frequencies. In another embodiment, the antenna unit 3 may include more than two antennas, and each antenna may be used to receive or transmit signals of different frequencies. Each antenna may also receive or transmit signals of the same frequency, but it is not limited thereto.

In one embodiment of the present disclosure, as shown in FIG. 3, the electronic device may further include a control circuit 9 disposed in the peripheral area B, wherein the control circuit 9 is electrically connected to the antenna unit 3. In more detail, the control circuit 9 may be electrically connected to the first antenna 31 and the second antenna 32, respectively. The control circuit 9 may be used to switch on the first antenna 31 or the second antenna 32 to enable the electronic device to operate signals of different frequencies. In the present disclosure, through directly disposing the control circuit 9 in the peripheral area B of the substrate 1, more specifically, through disposing the components of the antenna unit 3 in the peripheral area B of the substrate 1 by deposition, sputtering, coating, lithography process, other suitable methods or a combination thereof, there is no need to add an additional multiplexer (MUX) so as to achieve a cost-saving effect. In addition, in one embodiment of the present disclosure, although not shown in the figures, in the top view direction Z of the electronic device, the protective layer 4 may overlap at least part of the control circuit 9 and may be disposed on at least part of the control circuit 9. As a result, the deterioration of the control circuit 9 due to the influence of moisture or air may be reduced, thereby improving the reliability of the electronic device.

In one embodiment of the present disclosure, as shown in FIG. 3, the control circuit 9 may be electrically connected to the pads P through the first conductive wire L1 and the second conductive wire L2, respectively. In addition, the pads P may be each electrically connected to the circuit structure 5 (shown in FIG. 2). The first conductive wire L1 may be used to input a voltage source into the control circuit 9 to switch on the first antenna 31 or the second antenna 32. The second conductive wire L2 may be used to input the signal received by the first antenna 31 or the second antenna 32 into the circuit structure 5 (as shown in FIG. 2), or the second conductive wire L2 may be used to transmit the signal from the circuit structure 5 (as shown in FIG. 2) to the first antenna 31 or the second antenna 32. In the present disclosure, the materials of the first conductive wire L1 and the second conductive wire L2 may be the same or different, and the materials of the first conductive wire L1 and the second conductive wire L2 may each include gold, silver, copper, aluminum, titanium, chromium, nickel, molybdenum, tungsten, indium tin oxide (ITO), indium zinc oxide (IZO), indium tin zinc oxide (ITZO), indium gallium zinc oxide (IGZO) or a combination thereof, but the present disclosure is not limited thereto.

Figure 4:
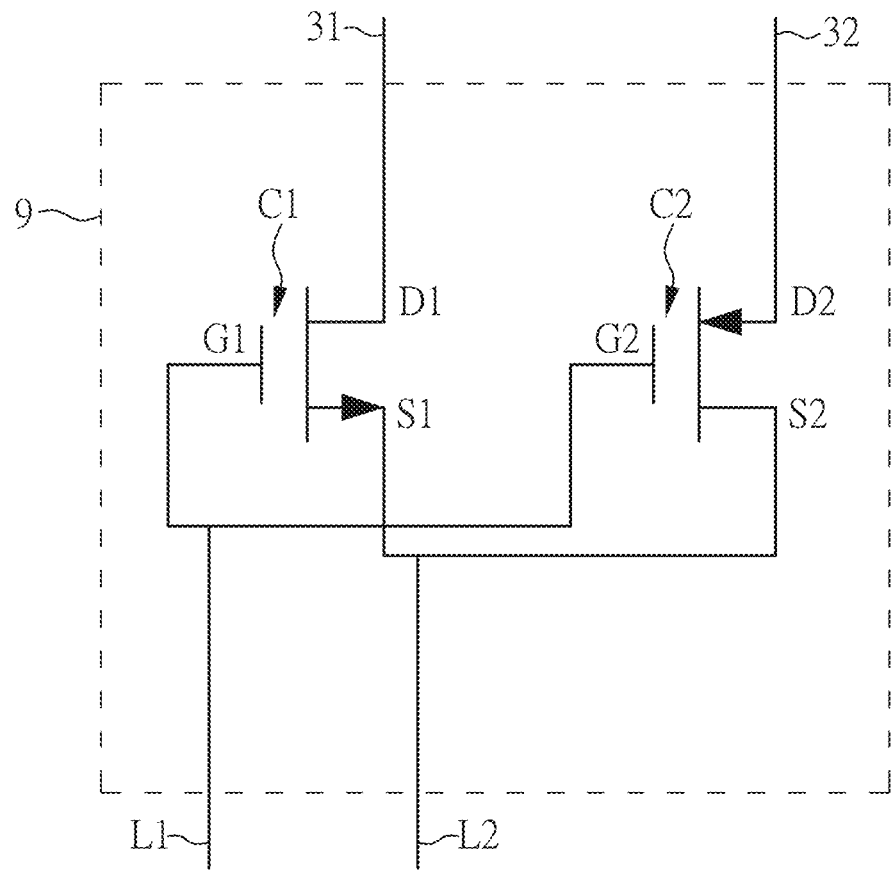
FIG. 4 is an equivalent circuit diagram of a control circuit according to an embodiment of the present disclosure.

FIG. 4 is an equivalent circuit diagram of a control circuit according to an embodiment of the present disclosure.

In one embodiment of the present disclosure, as shown in FIG. 4, the control circuit 9 includes: a first source S1, which is electrically connected to a first drain D1 through a first channel C1; and a second source S2, which is electrically connected to a second drain D2 through a second channel C2, wherein the doped carriers of the first channel C1 and the doped carriers of the second channel C2 are different. In one embodiment of the present disclosure, the doped carriers of the first channel C1 may be, for example, N-type carriers, and the doped carriers of the second channel C2 may be, for example, P-type carriers, but the present disclosure is not limited thereto.

In one embodiment of the present disclosure, as shown in FIG. 4, the control circuit 9 includes: a first gate G1, which may be electrically connected to the circuit structure 5 (as shown in FIG. 2) through the first conductive wire L1; and a second gate G2, which may be electrically connected to the circuit structure 5 (as shown in FIG. 2) through the first conductive wire L1. In one embodiment of the present disclosure, as shown in FIG. 4, the first source S1 may be electrically connected to the circuit structure 5 (shown in FIG. 2) through the second conductive wire L2, and the second source S2 may be electrically connected to the circuit structure 5 (shown in FIG. 2) through the second conductive wire L2. In one embodiment of the present disclosure, as shown in FIG. 4, the first drain D1 may be electrically connected to the first antenna 31, and the second drain D2 may be electrically connected to the second antenna 32. In one embodiment of the present disclosure, the first antenna 31 may be driven through the first gate G1, and the second antenna 32 may be driven through the second gate G2.

In one embodiment of the present disclosure, the control circuit 9 may input different voltages through the first conductive wire L1 to switch on the first antenna 31 or the second antenna 32, and the first antenna 31 or the second antenna 32 that is switched on may operate a signal of a specific frequency and input the signal into the circuit structure 5 (as shown in FIG. 2) through the second conductive wire L2, thereby controlling or driving the dimming unit 2 so that the electronic device may display an image.

Figure 5:
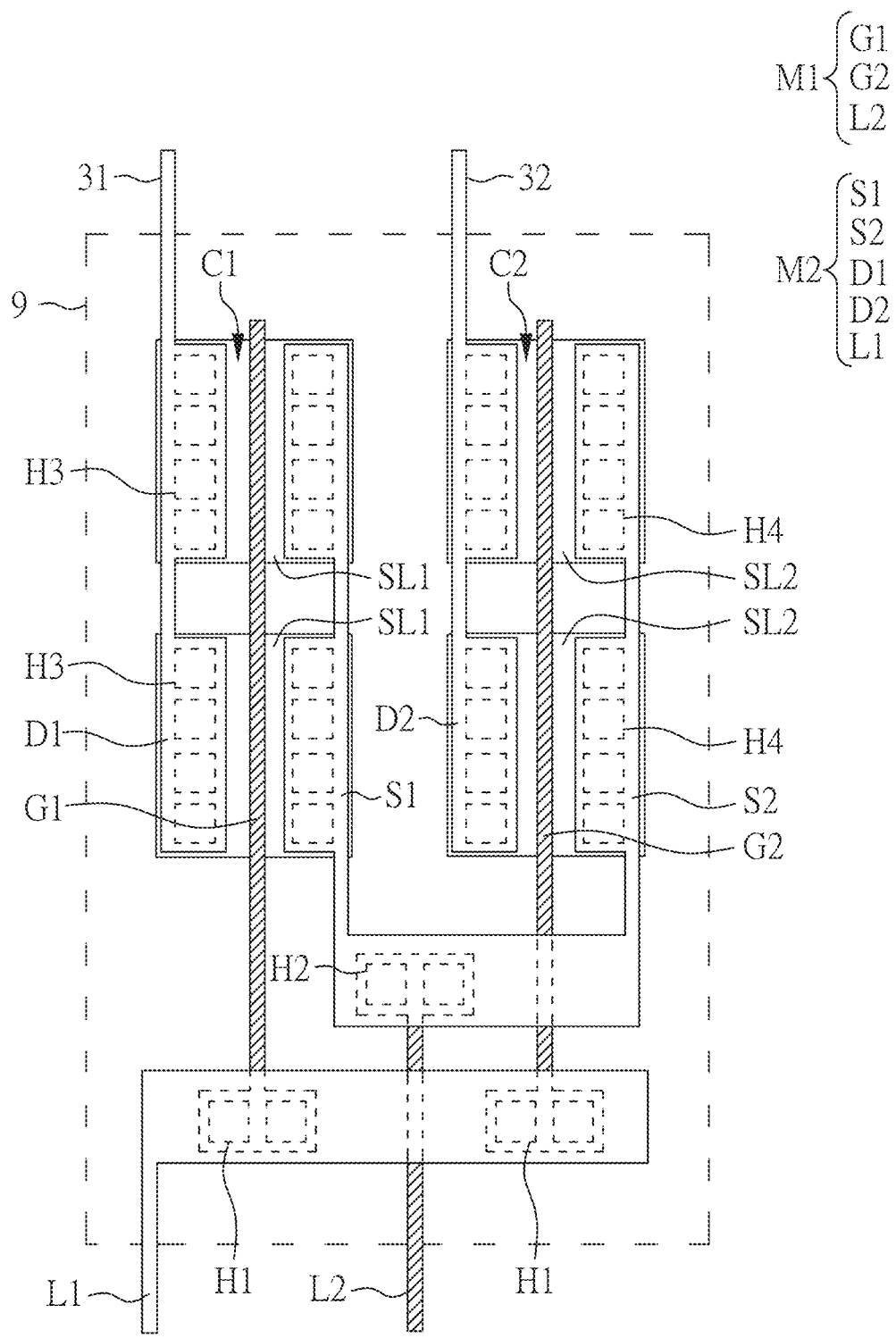
FIG. 5 is a schematic top view of a control circuit according to an embodiment of the present disclosure.

FIG. 5 is a schematic top view of a control circuit according to an embodiment of the present disclosure.

In one embodiment of the present disclosure, as shown in FIG. 5, the control circuit 9 includes: a first metal layer M1; a second metal layer M2 disposed on the first metal layer M1; and a first semiconductor layer SL1 and a second semiconductor layer SL2, wherein the first metal layer M1 is disposed on the first semiconductor layer SL1 and the second semiconductor layer SL2. The first metal layer M1 includes a first gate G1, a second gate G2 and a second conductive wire L2. The second metal layer M2 includes a first source S1, a first drain D1, a second source S2, a second drain D2 and first conductive wire L1. The first metal layer M1 may be electrically connected to the second metal layer M2 via the through holes H1 and H2 to transmit or receive signals. The first source S1 and the first drain D1 may be electrically connected to the first semiconductor layer SL1 via the through holes H3, respectively. The second source S2 and the second drain D2 may be electrically connected to the second semiconductor layer SL2 via the through holes H4, respectively. The doped carriers of the first semiconductor layer SL1 and the doped carriers of the second semiconductor layer SL2 are different.

In more detail, the voltage provided by the circuit structure 5 (as shown in FIG. 2) may be transmitted to the first metal layer M1 (such as the first gate G1 and the second gate G2) through the second metal layer M2 (such as the first conductive wire L1), so as to enable the first semiconductor layer SL1 to form the first channel C1 or enable the second semiconductor layer SL2 to form the second channel C2 according to the input voltage. The signal provided by the circuit structure 5 (shown in FIG. 2) may be transmitted to the second metal layer M2 (such as the first source S1 and the second source S2) through the first metal layer M1 (such as the second conductive wire L2) and via the through hole H2, thereby driving the first antenna 31 or the second antenna 32.

In the present disclosure, the electronic device may be any display device that requires an antenna unit, such as an electronic shelf label, a display device, a tiled antenna device, an advertising billboard, etc., but the disclosure is not limited thereto.

The aforementioned specific embodiments should be construed as merely illustrative, and not limiting the rest of the present disclosure in any way.

The invention claimed is:

1. An electronic device, comprising:
   a substrate including a display area and a peripheral area, wherein the peripheral area surrounds the display area;
   a dimming unit disposed in the display area;
   an antenna unit disposed in the peripheral area; and
   a protective layer disposed in the peripheral area,
   wherein, in a top view direction of the electronic device, the protective layer overlaps at least part of the antenna unit and is disposed on at least part of the antenna unit.

2. The electronic device as claimed in claim 1, wherein the antenna unit includes a first antenna and a second antenna, wherein an operating frequency of the first antenna is different from that of the second antenna.

3. The electronic device as claimed in claim 1, further comprising a first adhesive layer disposed between the substrate and the dimming unit.

4. The electronic device as claimed in claim 1, further comprising a control circuit disposed in the peripheral area, wherein the control circuit is electrically connected to the antenna unit.

5. The electronic device as claimed in claim 4, wherein, in the top view direction of the electronic device, the protective layer overlaps at least part of the control circuit and is disposed on at least part of the control circuit.

6. The electronic device as claimed in claim 4, wherein the control circuit includes:
   a first source electrically connected to a first drain through a first channel; and
   a second source electrically connected to a second drain through a second channel,
   wherein doped carriers of the first channel are different from doped carriers of the second channel.

7. The electronic device as claimed in claim 6, wherein the doped carriers of the first channel are N-type carriers, and the doped carriers of the second channel are P-type carriers.

8. The electronic device as claimed in claim 4, wherein the antenna unit includes a first antenna and a second antenna, and the control circuit includes:
   a first source electrically connected to a circuit structure;
   a first drain electrically connected to the first antenna;
   a second source electrically connected to the circuit structure; and
   a second drain electrically connected to the second antenna.

9. The electronic device as claimed in claim 8, wherein the control circuit includes: a first metal layer; a second metal layer disposed on the first metal layer; and a first semiconductor layer and a second semiconductor layer, wherein the first metal layer is disposed on the first semiconductor layer and the second semiconductor layer, the first metal layer includes a first gate and a second gate, and the second metal layer includes the first source, the first drain, the second source and the second drain.

10. The electronic device as claimed in claim 9, wherein the first metal layer is electrically connected to the second metal layer via first through holes and second through holes, the first source and the first drain are electrically connected to the first semiconductor layer via third through holes, respectively, the second source and the second drain are electrically connected to the second semiconductor layer via fourth through holes, respectively, and doped carriers of the first semiconductor layer are different from doped carriers of the second semiconductor layer.

11. The electronic device as claimed in claim 4, wherein the antenna unit includes a first antenna and a second antenna, and the control circuit includes:
a first gate electrically connected to a circuit structure; and
a second gate electrically connected to the circuit structure;
wherein the first antenna is driven through the first gate, and the second antenna is driven through the second gate.

12. The electronic device as claimed in claim 1, further comprising a support layer, wherein the substrate is disposed on the support layer.

13. The electronic device as claimed in claim 12, further comprising a second adhesive layer disposed between the substrate and the support layer.

14. The electronic device as claimed in claim 1, further comprising a protective substrate disposed on the dimming unit.

15. The electronic device as claimed in claim 14, further comprising a third adhesive layer disposed between the dimming unit and the protective substrate.

16. The electronic device as claimed in claim 1, further comprising a plurality of pads disposed in the peripheral area, wherein the antenna unit is electrically connected to one of the plurality of pads, and the dimming unit is electrically connected to another one of the plurality of pads.

17. The electronic device as claimed in claim 16, further comprising a circuit structure, wherein the circuit structure is electrically connected to the plurality of pads.

18. The electronic device as claimed in claim 16, further comprising a control circuit disposed in the peripheral area, wherein the control circuit is electrically connected to the plurality of pads through a first conductive wire and a second conductive wire, respectively.

19. The electronic device as claimed in claim 1, wherein the protective layer is disposed around the dimming unit to cover the antenna unit.

20. The electronic device as claimed in claim 1, further comprising a conductive element disposed on the substrate, wherein the conductive element is electrically connected to a conductive layer in the dimming unit.

* * * * *